(12) United States Patent
Mandal et al.

(10) Patent No.: US 10,957,024 B2
(45) Date of Patent: Mar. 23, 2021

(54) REAL TIME TONE MAPPING OF HIGH DYNAMIC RANGE IMAGE DATA AT TIME OF PLAYBACK ON A LOWER DYNAMIC RANGE DISPLAY

(71) Applicant: Microsoft Technology Licensing, LLC, Redmond, WA (US)

(72) Inventors: Saswata Mandal, Bellevue, WA (US); Ryan Y. Kim, Bellevue, WA (US); Kathleen A. Slattery, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 112 days.

(21) Appl. No.: 16/175,790

(22) Filed: Oct. 30, 2018

(65) Prior Publication Data
US 2020/0134792 A1    Apr. 30, 2020

(51) Int. Cl.
*G06K 9/40* (2006.01)
*G06T 5/00* (2006.01)
(Continued)

(52) U.S. Cl.
CPC ............... *G06T 5/009* (2013.01); *G06T 5/40* (2013.01); *G06T 5/50* (2013.01); *H04N 5/57* (2013.01);
(Continued)

(58) Field of Classification Search
CPC .. G06T 5/009; G06T 5/40; G06T 5/50; G06T 2207/20208; G06T 2207/20216; G06T 2207/10016; H04N 5/57
See application file for complete search history.

(56) References Cited

U.S. PATENT DOCUMENTS 6,914,614 B2   7/2005   Kobayashi
7,433,514 B2   10/2008  Sloan
(Continued)

FOREIGN PATENT DOCUMENTS

EP   3136375 A1   3/2017
EP   3139345 A1   3/2017
(Continued)

OTHER PUBLICATIONS

"Adobe Photoshop CC Help", Retrieved From: https://helpx.adobe.com/in/photoshop/user-guide.html, Jun. 19, 2016, 12 Pages.
(Continued)

*Primary Examiner* — Dhaval V Patel
(74) *Attorney, Agent, or Firm* — Arent Fox LLP

(57) ABSTRACT

A converter can process image data from input HDR images in real time to compute new metadata about the brightness, contrast, color gamut and/or color volume for the image data to be displayed from each frame. Existing metadata can be ignored. The converter can combine the metadata for a current HDR frame with metadata for a plurality of immediately previous sequential frames to provide parameters for tone mapping. The converter uses these parameters, and characteristics about a lower dynamic range display which will receive output image data, to define a transfer function for converting the input HDR image data into output image data for display. The converter analyzes and tone maps HDR frames at a rate sufficient to allow output video to be generated at a desired frame rate while receiving the image data from frames of the input HDR video at an input frame rate.

12 Claims, 4 Drawing Sheets

(51) Int. Cl.
  *G06T 5/40* (2006.01)
  *G06T 5/50* (2006.01)
  *H04N 5/57* (2006.01)
(52) U.S. Cl.
  CPC ............... *G06T 2207/10016* (2013.01); *G06T 2207/20208* (2013.01); *G06T 2207/20216* (2013.01)

(56) References Cited

U.S. PATENT DOCUMENTS

| | | | |
|---|---|---|---|
| 7,492,375 | B2 | 2/2009 | Toyama et al. |
| 7,953,286 | B2 | 5/2011 | Chiang et al. |
| 7,983,502 | B2 | 7/2011 | Cohen et al. |
| 8,014,445 | B2 | 9/2011 | Segall et al. |
| 8,218,625 | B2 | 7/2012 | Ward et al. |
| 8,248,486 | B1 | 8/2012 | Ward et al. |
| 8,314,847 | B2 | 11/2012 | Brunner |
| 8,330,768 | B2 | 12/2012 | Mantiuk et al. |
| 8,355,595 | B2 | 1/2013 | Bressan |
| 8,358,351 | B2 | 1/2013 | Brunner |
| 8,433,150 | B2 | 4/2013 | Yuan et al. |
| 8,514,453 | B2 | 8/2013 | Mebane |
| 8,593,480 | B1 | 11/2013 | Ballestad et al. |
| 8,606,009 | B2 | 12/2013 | Sun |
| 8,928,686 | B2 | 1/2015 | Messmer |
| 8,964,060 | B2 | 2/2015 | Levoy et al. |
| 9,064,313 | B2 | 6/2015 | Seshadrinathan et al. |
| 9,076,224 | B1 | 7/2015 | Shah et al. |
| 9,087,391 | B2 | 7/2015 | Geiss et al. |
| 9,230,509 | B2 | 1/2016 | Van Der Vleuten |
| 9,406,112 | B2 | 8/2016 | Banterle et al. |
| 9,497,380 | B1 | 11/2016 | Jannard et al. |
| 9,576,555 | B2 | 2/2017 | Ninan et al. |
| 9,635,377 | B2 | 4/2017 | Kim |
| 9,652,870 | B2 | 5/2017 | Li |
| 9,712,816 | B2 | 7/2017 | Garbas et al. |
| 9,741,099 | B2 | 8/2017 | Lim et al. |
| 9,860,504 | B2 | 1/2018 | Liu |
| 9,979,895 | B2 | 5/2018 | Smolic |
| 10,019,785 | B2 | 7/2018 | Hsu |
| 2005/0104900 | A1 | 5/2005 | Toyama et al. |
| 2005/0117799 | A1 | 6/2005 | Fuh et al. |
| 2007/0035706 | A1 | 2/2007 | Margulis |
| 2007/0201560 | A1 | 8/2007 | Segall et al. |
| 2007/0269132 | A1 | 11/2007 | Duan et al. |
| 2008/0068472 | A1 | 3/2008 | Zhou |
| 2009/0167672 | A1 | 7/2009 | Kerofsky |
| 2010/0226547 | A1 | 9/2010 | Criminisi et al. |
| 2011/0095875 | A1 | 4/2011 | Thyssen et al. |
| 2011/0188744 | A1 | 8/2011 | Sun |
| 2011/0194618 | A1 | 8/2011 | Gish et al. |
| 2011/0255101 | A1 | 10/2011 | Edge |
| 2012/0057803 | A1 | 3/2012 | Wakazono |
| 2012/0081385 | A1 | 4/2012 | Cote et al. |
| 2012/0081566 | A1 | 4/2012 | Cote et al. |
| 2012/0081577 | A1 | 4/2012 | Cote et al. |
| 2012/0147593 | A1 | 6/2012 | Yapel et al. |
| 2012/0147953 | A1 | 6/2012 | El-mahdy et al. |
| 2012/0218442 | A1 | 8/2012 | Jandhyala et al. |
| 2012/0314944 | A1 | 12/2012 | Ninan et al. |
| 2013/0038790 | A1 | 2/2013 | Seetzen et al. |
| 2013/0083838 | A1 | 4/2013 | Touze et al. |
| 2013/0120656 | A1 | 5/2013 | Wilson et al. |
| 2013/0155330 | A1 | 6/2013 | Longhurst et al. |
| 2013/0241931 | A1 | 9/2013 | Mai et al. |
| 2014/0002694 | A1 | 1/2014 | Levy et al. |
| 2014/0092012 | A1 | 4/2014 | Seshadrinathan et al. |
| 2014/0210847 | A1 | 7/2014 | Knibbeler et al. |
| 2014/0229875 | A1 | 8/2014 | Li et al. |
| 2014/0241418 | A1 | 8/2014 | Garbas et al. |
| 2014/0368557 | A1 | 12/2014 | Bastani |
| 2015/0078661 | A1 | 3/2015 | Granados et al. |
| 2015/0103091 | A1 | 4/2015 | Messmer |
| 2015/0117791 | A1 | 4/2015 | Mertens |
| 2015/0169204 | A1 | 6/2015 | Deselaers et al. |
| 2015/0243200 | A1 | 8/2015 | Pan |
| 2015/0243243 | A1 | 8/2015 | Greenebaum et al. |
| 2015/0341611 | A1 | 11/2015 | Oh et al. |
| 2015/0350513 | A1 | 12/2015 | Zhang et al. |
| 2015/0358646 | A1 | 12/2015 | Mertens |
| 2016/0005349 | A1 | 1/2016 | Atkins et al. |
| 2016/0036074 | A1 | 2/2016 | Kim et al. |
| 2016/0080716 | A1 | 3/2016 | Atkins et al. |
| 2016/0124451 | A1 | 5/2016 | Yoshitani |
| 2016/0125580 | A1 | 5/2016 | He |
| 2016/0134853 | A1 | 5/2016 | Gish et al. |
| 2016/0140513 | A1 | 5/2016 | Yoshikawa |
| 2016/0241829 | A1 | 8/2016 | Qu et al. |
| 2016/0248939 | A1 | 8/2016 | Thurston et al. |
| 2016/0255356 | A1 | 9/2016 | Strom et al. |
| 2016/0269676 | A1 | 9/2016 | Yamamoto et al. |
| 2016/0286226 | A1 | 9/2016 | Ridge et al. |
| 2016/0300537 | A1 | 10/2016 | Hoffman et al. |
| 2016/0309154 | A1 | 10/2016 | Rusanovskyy et al. |
| 2016/0345017 | A1 | 11/2016 | Lasserre et al. |
| 2016/0360171 | A1 | 12/2016 | Tao |
| 2016/0360174 | A1 | 12/2016 | Tao et al. |
| 2016/0381335 | A1 | 12/2016 | Tao et al. |
| 2016/0381363 | A1 | 12/2016 | Tao et al. |
| 2017/0026646 | A1 | 1/2017 | Minoo et al. |
| 2017/0064334 | A1 | 3/2017 | Minoo |
| 2017/0085880 | A1 | 3/2017 | Minoo et al. |
| 2017/0085895 | A1 | 3/2017 | Gu et al. |
| 2017/0103729 | A1 | 4/2017 | Huang et al. |
| 2017/0140513 | A1 | 5/2017 | Su et al. |
| 2017/0272690 | A1 | 9/2017 | Seifi et al. |
| 2017/0330312 | A1* | 11/2017 | Nam ................ G06T 5/009 |
| 2017/0339433 | A1 | 11/2017 | Mertens |
| 2018/0007356 | A1* | 1/2018 | Kadu ................ H04N 19/186 |
| 2018/0098094 | A1 | 4/2018 | Wen |
| 2018/0124368 | A1 | 5/2018 | Liu |
| 2018/0152686 | A1 | 5/2018 | Wozniak et al. |
| 2019/0019277 | A1* | 1/2019 | Chen ................ H04N 5/202 |
| 2019/0370946 | A1* | 12/2019 | Samadani ............ H04N 5/2355 |

FOREIGN PATENT DOCUMENTS

| | | |
|---|---|---|
| WO | 2012125802 A1 | 9/2012 |
| WO | 2015036358 A1 | 3/2015 |
| WO | 2015130793 A1 | 9/2015 |
| WO | 2016020189 A1 | 2/2016 |
| WO | 2016049327 A1 | 3/2016 |
| WO | 2016120108 A1 | 8/2016 |
| WO | 2016124451 A1 | 8/2016 |
| WO | 2016192937 A1 | 12/2016 |

OTHER PUBLICATIONS

"Non Final Office Action Issued in U.S. Appl. No. 15/385,711", dated May 4, 2018, 8 Pages.

"Notice of Allowance Issued in U.S. Appl. No. 15/385,711", dated Oct. 15, 2018, 10 Pages.

"Final Office Action Issued in U.S. Appl. No. 15/385,750", dated Nov. 29, 2018, 21 Pages.

"Non Final Office Action Issued in U.S. Appl. No. 15/385,750", dated Jan. 31, 2018, 18 Pages.

"Non-Final Office Action Issued in U.S. Appl. No. 15/385,750", dated Jul. 17, 2018, 19 Pages.

"Non Final Office Action Issued in U.S. Appl. No. 15/418,522", dated Sep. 18, 2017, 31 Pages.

"Notice of Allowance Issued in U.S. Appl. No. 15/418,530", dated Aug. 28, 2018, 19 Pages.

"Non Final Office Action Issued in U.S. Appl. No. 15/418,530", dated Sep. 7, 2017, 25 Pages.

Boitard, et al., "Temporal Coherency for Video Tone Mapping", In Proceedings of SPIE Applications of Digital Image Processing, Oct. 2012, 10 Pages.

Dersch, "Interactive Java Viewer for HDR-panoramas", Retrieved From: https://webuser.hs-furtwangen.de/~dersch/hdr/HDRViewer.pdf, Dec. 28, 2003, 6 Pages.

(56) References Cited

OTHER PUBLICATIONS

Guthier, et al., "Flicker Reduction in Tone Mapped High Dynamic Range Video", In Proceedings of SPIE Color Imaging, vol. 7866, Jan. 2011, 15 Pages.

Hart, "UHD Color for Games", Retrieved From: https://developer.nvidia.com/sites/default/files/akamai/gameworks/hdr/UHDColorForGames.pdf, Jun. 2016, 41 Pages.

Kiser, et al., "Real Time Automated Tone Mapping System for HDR Video", In Proceedings of IEEE International Conference on Image Processing, Sep. 2012, 4 Pages.

Korshunov, et al., "A JPEG Backward-compatible HDR Image Compression", In Proceedings of International Society for Optics and Photonics, Oct. 2012, 12 Pages.

Le Pendu, "Backward Compatible Approaches for the Compression of High Dynamic Range Videos", In Proceedings of ACM SIGGRAPH, Mar. 2016, 2 Pages.

Mantiuk, et al., "Backward Compatible High Dynamic Range MPEG Video Compression", In Proceedings of ACM Transactions on Graphics, vol. 25, No. 3, Jul. 2006, 11 Pages.

Mantiuk, et al., "Display Adaptive Tone Mapping", In Journal of ACM Transactions on Graphics (TOG), vol. 27, Issue 3, Aug. 2008, 10 Pages.

Melo, et al., "Context-aware HDR video distribution for mobile devices", In Journal of Multimedia Tools and Applications, vol. 76, Issue: 15, Sep. 14, 2016, 20 Pages.

Melo, et al., "High Dymanic Range Video for Mobile Devices", Retrieved From: https://search.proquest.com/docview/2027206496?pq-origsite=gscholar, 2015, 136 Pages.

Melo, et al., "High Dynamic Range Video for Mobile Devices", In Ph.D. Thesis in Computer Science, Universidade de Tras-Os-Montes E Alto Douro, Portugal, Jan. 2016, 136 Pages.

Melo, et al., "Screen reflections impact on HDR video tone mapping for mobile devices: an evaluation study", In EURASIP Journal on Image and Video Processing, Dec. 15, 2015, pp. 1-13.

Meylan, "High Dynamic Range Image Rendering With a Retinex-Based Adaptive Filter", In Proceedings of IEEE Transactions on Image Processing, vol. 15, Issue 9, 2006, 12 Pages.

Meylan, "Tone Mapping for High Dynamic Range Images", Dissertation Submitted in Partial Fulfilment of the Degree of Doctor of Philosophy to the Federal Institute of Technology in Lausanne, Jul. 2006, 175 Pages.

"International Search Report and Written Opinion Issued in PCT Application No. PCT/US17/062660", dated Mar. 14, 2018, 15 Pages.

"International Search Report and Written Opinion Issued in PCT Application No. PCT/US18/014601", dated Apr. 24, 2018, 14 Pages.

"International Search Report and Written Opinion Issued in PCT Application No. PCT/US2017/062659", dated Jan. 30, 2018, 11 pages.

Shahid, et al., "A New Hybrid Tone Mapping Scheme for High Dynamic Range (HDR) Videos", In Proceedings of IEEE International Conference on Consumer Electronics, Jan. 2015, 2 Pages.

Touze, et al., "HDR Video Coding Based on Local LDR Quantization", In Proceedings of International Conference and SME Workshop on HDR Imaging, Mar. 2014, 6 Pages.

Schulte, Tom and Joel Barsotti, "HDR Demystified", Version 1.0, Mar. 2016, from http://files.spectracal.com/Documents/White Papers/HDR_Demystified.pdf, pp. 1-22.

Borg, Lars, Webcast handout for "SMPTE ST 2094 and Dynamic Metadata", SMPTE Standards Webcast Series, from https://www.smpte.org/sites/default/files/2017-01-12-ST-2094-Borg-V2-Handout.pdf, pp. 1-15.

Colorfront, "User Guide: Transkoder 2016 Update 2", Table of Contents and Chapter 13, Aug. 3, 2018, pp. 180-193.

"International Search Report and Written Opinion Issued in PCT Application No. PCT/US19/057109", dated Jan. 21, 2020, 11 Pages.

\* cited by examiner

REAL TIME TONE MAPPING OF HIGH DYNAMIC RANGE IMAGE DATA AT TIME OF PLAYBACK ON A LOWER DYNAMIC RANGE DISPLAY

BACKGROUND

Digital media data, such as audio and video and still images, are commonly encoded into bitstreams that are transmitted or stored in data files, where the encoded bitstreams conform to specifications for established standards or proprietary formats. Such specifications generally define structures for storing data including metadata about the encoded bitstream and for storing encoded media data. Metadata may be defined by named fields which have values, which may be stored as name-value pairs. The specification for a standard generally defines which structures are required, which structures are optional, and what various structures, fields and field values mean.

Some digital video is produced using high dynamic range (HDR) images. Several standards and proprietary formats are available for storing HDR image data, such as HDR10, HDR10+, DolbyVision, Hybrid Log-Gamma, and SL-HDR1 formats and formats compliant with BT.2020 and SMPTE.2084 standards. The dynamic range of a display can be described in terms of its contrast, which is the difference between the brightest white and the darkest black that can be produced on the display. This difference is typically specified in units of candelas per square meter (cd/m2), also known as "nits". An HDR image is an image that is "mastered" on, or originally produced for, an HDR display. A standard television display generally can produce a few hundred nits, e.g., 300 to 500 nits. High dynamic range displays generally can produce a few thousand nits, e.g., 1000 to 3000 nits, with some producing up to 10000 nits. The pixel data for an HDR image can be within a range of a few hundred nits to several hundred thousand nits.

HDR images can be displayed on a display with a lower dynamic range if the pixel data is appropriately mapped to account for differences in peak brightness, contrast, color gamut, and color volume, between the dynamic range of the image and the lower dynamic range of the display. To enable such mapping to be performed, HDR images generally are accompanied by metadata describing the content of the images as they may appear on a mastering display. Such metadata is defined in standards known as SMPTE-2086 and SMPTE-2094 and its variants. Similar metadata is specified in the DolbyVision format.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In practice, the metadata included with high dynamic range video, about the brightness, contrast, color gamut and/or color volume, may not be useful for converting high dynamic range pixel data for use on a lower dynamic range display. There are several possible problems that can arise.

A variety of software tools are available which can be used to ensure that an HDR image or HDR video is compliant with a standard. Such tools typically generate the metadata for the HDR image or the HDR video. In some cases, such tools can produce incorrect metadata. Also, in most standards, the metadata is optional. Therefore, in some cases, the tool may not generate, or may not store, or may not verify this metadata, and the metadata can be missing or incorrect. Finally, the metadata provided according to the standard generally underspecifies parameters to be used in tone mapping.

For HDR video, the metadata can include values that are maximum values with respect to multiple images, whether for a group of pictures in the HDR video or for an entire HDR video stream. Such data may include, for example, the highest frame average brightness among the multiple images, or a brightest pixel among the multiple images. Such metadata might not be useful for transforming only a temporal subset of the HDR video stream if only that temporal subset is being used. A temporal subset may result from various video editing or playback operations.

As another example, such metadata, whether for a single HDR image or multiple HDR images, generally is based on data of all pixels in the image. Such metadata might not be useful for transforming only a spatial subset of the HDR image, or only a spatial subset of one or more frames of HDR video. A spatial subset may result from various image processing operations, such as graphic overlays, titles, subtitles, closed-captioning, picture-in-picture, pan and scan effects, cropping, zooming, matting effects, various two-dimensional and three-dimensional effects, and other forms of image processing that include a spatial sampling of one or more images. The metadata for an HDR image may no longer produce an optimal lower dynamic range image if only a spatial subset of the HDR image is being displayed.

If incorrect metadata is used to convert HDR video to lower dynamic range video, the lower dynamic range video may have perceivable artifacts, typically in the form of incorrect brightness in a single image or uneven brightness within a sequence of images.

Whether an input HDR image or video includes metadata or not, a converter can process the image data from the input HDR image or video to compute new metadata about the brightness, contrast, color gamut and/or color volume for the image data to be displayed. The image data to be displayed may be temporal or spatial subset of the HDR image or HDR video and may have been subjected to additional processing. Existing metadata can be ignored. Image data from HDR video can be processed in real time. The converter receives and analyzes the image data to be displayed and computes the metadata for that image data. For HDR video, the converter can combine the metadata for the image data to be displayed from one frame of HDR video with metadata computed for a plurality of immediately previous sequential frames to provide parameters for tone mapping. The converter uses these parameters, and characteristics about a lower dynamic range display which will receive output lower dynamic range video, to define a transfer function for converting the input HDR image data into the lower dynamic range output image data for display. The converter can process the image data from frames of HDR video in real time, i.e., at a rate sufficient to allow the output video to be generated at a desired frame rate while receiving or reading the input HDR video at an input frame rate.

The converter can be part of, for example, a decoder, playback application, player device, game platform, or other application on or hardware in a computing device that displays high dynamic range video on a lower dynamic range display device.

In the following description, reference is made to the accompanying drawings which form a part hereof, and in which are shown, by way of illustration, specific example

DETAILED DESCRIPTION

The following section provides an example operating environment for a converter of high dynamic range video.

Figure 1:
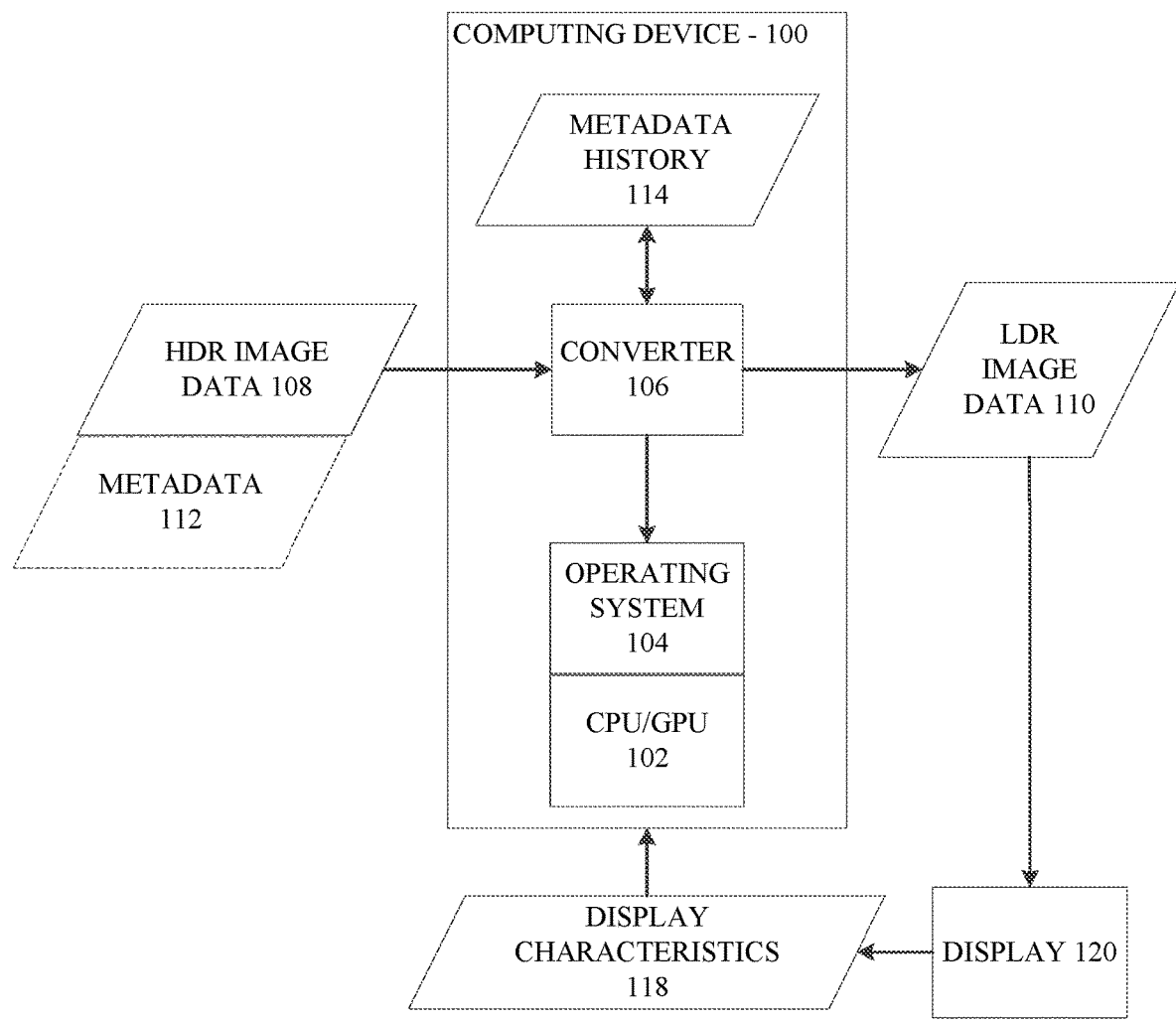
FIG. 1 is a block diagram of an example operating environment for a converter of high dynamic range video.

Referring to FIG. 1, an example computing device 100 includes hardware 102, including a central processing unit and an optional graphics processing unit, and an operating system 104 which support the operation of a converter 106. The converter transforms image data to be displayed from HDR images and HDR video into lower dynamic range (LDR) image data. The converter 106 can be an application that runs on, or can be hardware in, the computing device 100. In computing device 100, the operating system 104 can manage access by the converter 106 to the resources of the computing device 100 including its hardware 102. The computing device 100 is described in more detail below by the example computer hardware of FIG. 4.

The converter 106 can be part of video processing circuitry or software (not shown) that reads, decodes and processes high dynamic range (HDR) image data 108. The image data 108 can be in the form of a single HDR image or in the form of HDR video. Such image data generally is encoded into a bitstream that is compliant with a standard data format, such as HDR10, HDR10+, DolbyVision, Hybrid Log-Gamma, and SL-HDR1 formats, which the video processing circuitry or software is implemented to handle. An encoded bitstream for HDR video generally encodes a sequence of HDR frames using a combination of metadata which defines a structure for the sequence of frames, encoded image data, and additional metadata about the image data and sequence of frames. According to standards such as SMPTE-2086 and SMPTE-2090 and its variants, HDR image data 108 generally is accompanied by associated metadata 112 about the brightness, contrast, color gamut and/or color volume of an HDR frame with respect to a mastering display. HDR video generally is transmitted to the video processing circuitry or software including the converter 106 as a streaming bitstream, or is stored in one or more data files from which the video processing circuitry or software including the converter reads a streaming bitstream. A streaming bitstream is a bitstream for which data is continually being received at a rate enabling processing of the bitstream to generate output image data at a desired frame rate.

The converter 106 can be part of any video processing circuitry or software that reads and decodes image data 108 from an HDR image or HDR video to output lower dynamic range (LDR) image data 110 for a display 120. For example, but not limited to these examples, a converter can be part of a decoder, playback application, player device, game platform, video playback devices, televisions, set-top boxes for cable television systems, video editing systems, or other application or hardware which receives high dynamic range video and outputs image data to a lower dynamic range display device.

The display 120 has display characteristics 118 which can be read by, or transmitted to, the computing device 100 for use by the converter 106. For example, some display devices, such as televisions, may provide information such as a highest brightness, maximum color primaries, and/or a white point. Data about the display also could be measured by color meters. For example, a maximum brightness for a 10% window and 50% window could be measured on a display such as an OLED display.

In practice, an HDR image or HDR video may include metadata 112 about the brightness, contrast, color gamut and/or color volume which is incorrect, incomplete, missing, or otherwise not useful in transforming the image data to be displayed into a lower dynamic range image data. If this metadata is used to convert HDR image data into lower dynamic range image data, the lower dynamic range image data may have perceivable artifacts, typically in the form of incorrect brightness in a single image or uneven brightness within a sequence of images.

Whether the input HDR image or video includes metadata 112 or not, a converter can process the image data to be displayed to compute new metadata about the brightness, contrast, color gamut and/or color volume for the image data to be displayed. Existing metadata 112 can be ignored. For HDR video, the image data to be displayed can be processed in real time during playback on the lower dynamic range display.

The converter 106 receives and analyzes the image data to be displayed from the input HDR image data 108 and computes the new metadata for the image data to be displayed. The image data to be displayed may be a temporal and/or spatial subset of the HDR image or HDR video and may have been subjected to additional image processing. When processing video, the converter can combine the new metadata with metadata computed for a plurality of immediately previous sequential frames, as indicated by the real time metadata history 114. This new metadata is used by the converter to provide parameters for tone mapping. The converter 106 uses parameters generated based on the new metadata, and optionally the real time metadata history 114, and characteristics 118 about the display 120 which will receive the output image data 110, to define a transfer function for converting the image data to be displayed into output LDR image data 110 for display. For video, the converter 106 can perform this analysis in real time, i.e., at a rate sufficient to allow the output LDR image data to be generated at a desired output frame rate while receiving or reading the input image data at an input frame rate.

Figure 2:
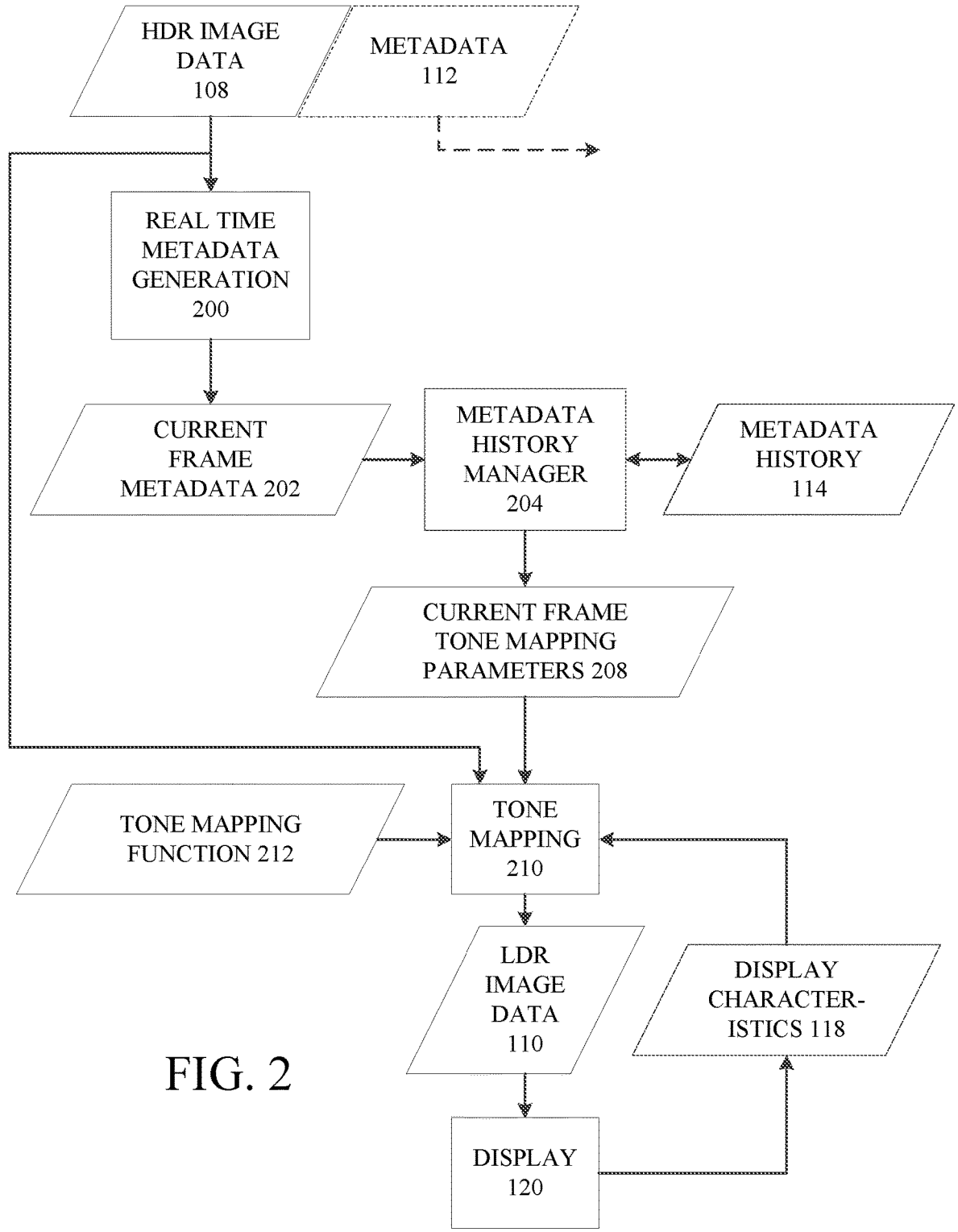
FIG. 2 is a data flow diagram describing an example implementation of a converter
Figure 3:
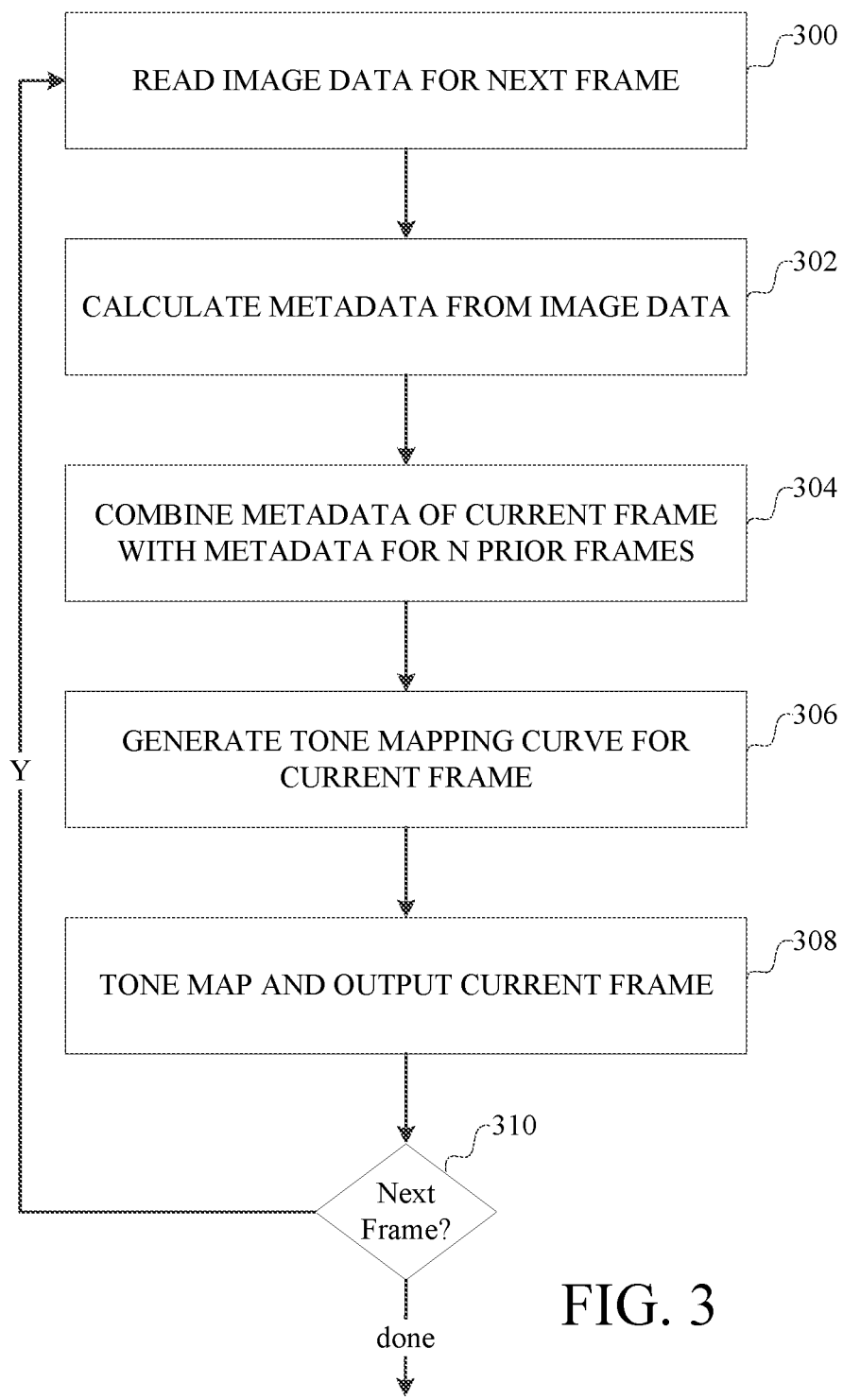
FIG. 3 is a flow chart describing operation of an example implementation of a converter.

Referring now to FIGS. 2 and 3, a data flow diagram of, and a flow chart describing, an example implementation of a converter 106, for processing HDR video, will now be described. An HDR still image can be processed as a single image in a less complex version of the converter 106. The converter 106 includes a real time metadata computer 200, which receives the HDR video 108 at an input, and computes metadata 202 for a current frame. The computed metadata describes the brightness, contrast, color gamut and/or color volume for the image data from the current frame which is to be displayed. The computed metadata can be the metadata specified by the SMPTE-2086 or SMPTE-2090 standards. This metadata can be stored in a buffer (not shown). The essence, i.e., the image data for the current frame of HDR video can be placed in a buffer (not shown).

Any encoded metadata 112 that is part of the input HDR video, if present, can be ignored.

A metadata history manager 204 can store metadata 202 with metadata computed for a plurality of immediately previous sequential images in the HDR video 108. The metadata history manager 204 combines the metadata 202 for the current HDR image with the metadata for a plurality of immediately previous sequential images, indicated as a metadata history 206, to provide parameters 208 for tone mapping the current frame.

A tone mapping module 210 receives several inputs. It receives the parameters 208 for tone mapping the image data from the current frame, characteristics 118 about a lower dynamic range (LDR) display 120 which will receive output LDR image data 110, and data defining a transfer function 212 for converting the image data to be displayed from the input HDR video into output LDR image data for the display 120. The display 120 may be a standard dynamic range display, an enhance dynamic range display, or any other display having a dynamic range smaller than the dynamic range used in the input image data. The tone mapping module applies a tone mapping function based on these inputs to the image data to be displayed from the current frame of the HDR video 108 to generate corresponding LDR image data 110 for an output frame of video.

The tone mapping module can be implemented using any of a variety of conventional techniques for tone mapping which could use the metadata 112 that otherwise accompanies HDR video 108. However, in lieu of the received metadata 112 for a current frame, the tone mapping module receives parameters 208 for the tone mapping function 212, where those parameters are based on newly calculated metadata 202 for the current frame and metadata computed for a plurality of immediately previous sequential images.

Generating the parameters for tone mapping can be based on metadata computed for the image data to be displayed from the current frame and metadata for a plurality of immediately previous sequential images or frames. Data for roughly about one (1) second of video can be used. For example, about 120 frames or less may be used. As another example, about eight frames or more may be used. As another example, between about eight frames and about 120 frames may be used. For example, depending on the frame rate, metadata computed for about 24 to 72 frames may be used.

The metadata computed for a current frame can include data indicative of a luminance range including the pixels of the image data to be displayed from the current frame. The image data is converted to from its input color space, such as BT.2020 SMPTE.2084 YUV to a color space suitable for computing metadata, such as BT.2020 linear RGB. The luminance range can be computed, for example, by generating a histogram of the luminance values for the pixels in the image. Reference luminance levels describing the luminance range are determined based on the histogram. For example, given a luminance histogram, the 10%, 50%, 90% and 99.9% luminance levels in the HDR image can be identified. This example metadata, as can other metadata, includes luminance levels in addition to those specified in the standards to allow for more control points for specifying tone mapping.

As in the SMPTE-2086 standard, other metadata can include data specifying the color primaries and white point. In an implementation using an input color format of BT.2020, the data already specifies the white point. The data specifying the color primaries can be computed based on RGB values of picture. In some implementation, the color primaries are not used. Tone mapping parameters also can be computed based on maximum RGB values.

Now, if the new metadata computed for each single input HDR frame in a sequence of images in HDR video were used to tone map that respective single frame, there likely would be flicker and other artifacts occurring from frame to frame as the sequence is displayed. These artifacts would occur because each frame may have slightly different metadata calculated for it. Accordingly, the parameters used for tone mapping are based on the new metadata for the image data from the current HDR frame and on metadata computed for the image data from a plurality of immediately previous sequential frames from the HDR video. There are several techniques that could be used.

For example, given new metadata for image data from the current HDR frame, tone mapping parameters can be computed. For any subsequent HDR frame, if the tone mapping parameters computed for the image data from that subsequent frame are within a range of the tone mapping parameters computed for the prior frame, then the tone mapping parameters of the subsequent frame are used. Otherwise, filtered tone mapping parameters are used.

As another example, a running average of the tone mapping parameters computed for a plurality of frames can be averaged together. As another example, a running average of the metadata computed for a plurality of frames can be averaged together. For example, a window filter or a weighted average can be used to accomplish this averaging, given a number of frames to be averaged. As another example, the tone mapping parameters of a subsequent frame can be limited to a specified difference from the last applied parameters.

The converter implementation in FIG. 2 can operate on the image data to be displayed from each HDR image 108 in the input HDR video in real time, i.e., at a rate sufficient to allow the output LDR image data 10 to be generated at a desired frame rate while receiving or reading the image data from the input HDR video at an input frame rate. In one implementation, the converter can be implemented using a computer program executing on a central processing unit to compute metadata for the image data from a current HDR frame, and to compute tone mapping parameters. A computer program called a shader, to be executed on the graphics processing unit, can be used to implement the tone mapping on the image data from the current HDR frame to generate the image data for the output LDR image data. In other implementations, the processing can be performed in hardware, either as part of a computer or as part of a display device.

Referring now to FIG. 3, an example flowchart describing an example operation of a converter will now be described. In this example, it is assumed that the HDR video 108 is a sequence of HDR frames with accompanying metadata. The process begins by reading 300 the image data to be displayed from a current frame the HDR video. The image data is processed to calculate 302 the metadata describing the brightness, contrast, color gamut and/or color volume of the image data to be displayed from the current frame. The metadata is combined 304 with metadata computed for prior frames, such as for a plurality of immediately previous sequential frames, in the manner described above, to provide parameters for tone mapping. A tone mapping curve is generated 308 for the current frame based on the parameters for the current frame, characteristics of a lower dynamic range display which will receive output LDR image data corresponding to the image data from the current HDR frame. The LDR image data can be output to the display. If a next frame from the HDR video is available to be processed, as indicated at 310, the step 300-308 are repeated for this next frame.

By processing the image data to be displayed from input HDR images to generate new metadata, and by generating parameters for tone mapping based on the new metadata for a current frame and new metadata computed for a plurality of immediately previous sequential frames, output LDR image data is generated with reduced visible artifacts. With such processing performed in real time, the conversion can occur at the point of playback with information about the display to which a converter is connected and will output the converted video data.

Figure 4:
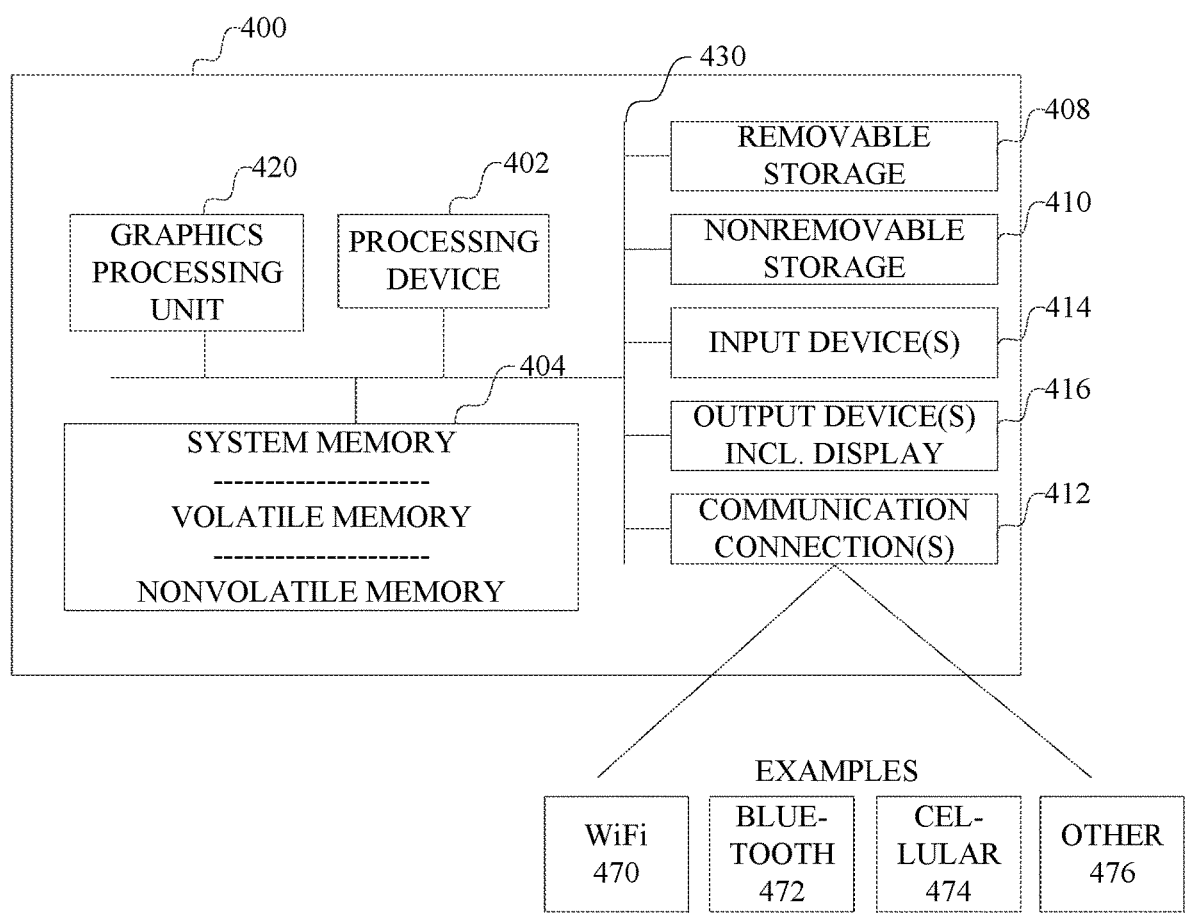
FIG. 4 is a block diagram of an example computing device with which components of such a system can be implemented.

Having now described an example implementation, FIG. 4 illustrates an example of a computer with which components of the computer system of the foregoing description can be implemented. This is only one example of a computer and is not intended to suggest any limitation as to the scope of use or functionality of such a computer.

The computer can be any of a variety of general purpose or special purpose computing hardware configurations. Some examples of types of computers that can be used include, but are not limited to, personal computers, game consoles, set top boxes, personal computers, hand-held or laptop devices (for example, media players, notebook computers, tablet computers, cellular phones including but not limited to "smart phones", personal data assistants, voice recorders), server computers, multiprocessor systems, microprocessor-based systems, programmable consumer electronics, networked personal computers, minicomputers, mainframe computers, distributed computing environments that include any of the above types of computers or devices, and the like.

With reference to FIG. 4, a computer 400 includes a processing system comprising at least one processing device 402 and at least one memory 404. The processing device 402 can have multiple processing devices; the memory 404 can include multiple memory devices. A processing device 402 comprises a process which is logic circuitry which responds to and processes instructions to provide the functions of the computer. A processing device can include one or more processing cores (not shown) that are multiple processors within the same logic circuitry which can operate independently of each other. Generally, one of the processing devices is designated as a primary processor, typically called the central processing unit (CPU). One or more additional co-processing units, such as a graphics processing unit (GPU) 420, also can be present in the computer. A co-processing unit comprises a processor that performs operations that supplement the central processing unit, such as but not limited to graphics operations and signal processing operations.

The memory 404 may include volatile computer storage devices (such as dynamic random-access memory (DRAM) or other random-access memory device), and nonvolatile computer storage devices (such as a read-only memory, flash memory, and the like) or some combination of the two. A nonvolatile computer storage device is a computer storage device whose contents are not lost when power is removed. Other computer storage devices, such as dedicated memory or registers, also can be present in the one or more processors. The computer 400 can include additional computer storage devices (whether removable or non-removable) such as, but not limited to, magnetically-recorded or optically-recorded disks or tape. Such additional computer storage devices are illustrated in FIG. 1 by removable storage device 408 and non-removable storage device 410. Such computer storage devices 408 and 410 typically are nonvolatile storage devices. The various components in FIG. 4 are generally interconnected by an interconnection mechanism, such as one or more buses 430.

A computer storage device is any device in which data can be stored in and retrieved from addressable physical storage locations by the computer by changing state of the device at the addressable physical storage location. A computer storage device thus can be a volatile or nonvolatile memory, or a removable or non-removable storage device. Memory 404, removable storage 408 and non-removable storage 410 are all examples of computer storage devices. Some examples of computer storage devices are RAM, ROM, EEPROM, flash memory or other memory technology, CD-ROM, digital versatile disks (DVD) or other optically or magneto-optically recorded storage device, magnetic cassettes, magnetic tape, magnetic disk storage or other magnetic storage devices. Computer storage devices and communication media are distinct categories, and both are distinct from signals propagating over communication media.

Computer 400 may also include communications connection(s) 412 that allow the computer to communicate with other devices over a communication medium. Communication media typically transmit computer program instructions, data structures, program modules or other data over a wired or wireless substance by propagating a modulated data signal such as a carrier wave or other transport mechanism over the substance. The term "modulated data signal" means a signal that has one or more of its characteristics set or changed in such a manner as to encode information in the signal. By way of example, and not limitation, communication media includes wired media, such as metal or other electrically conductive wire that propagates electrical signals or optical fibers that propagate optical signals, and wireless media, such as any non-wired communication media that allows propagation of signals, such as acoustic, electromagnetic, electrical, optical, infrared, radio frequency and other signals.

Communications connections 412 are devices, such as a wired network interface, wireless network interface, radio frequency transceiver, e.g., Wi-Fi 470, cellular 474, long term evolution (LTE) or Bluetooth 472, etc., transceivers, navigation transceivers, e.g., global positioning system (GPS) or Global Navigation Satellite System (GLONASS), etc., transceivers, and network interface devices 476, e.g., Ethernet, etc., or other device, that interface with communication media to transmit data over and receive data from signal propagated over the communication media.

The computer 400 may have various input device(s) 414 such as a pointer device, keyboard, touch-based input device, pen, camera, microphone, sensors, such as accelerometers, thermometers, light sensors and the like, and so on. The computer 400 may have various output device(s) 416 such as a display, speakers, and so on. Such devices are well known in the art and need not be discussed at length here. Various input and output devices can implement a natural user interface (NUI), which is any interface technology that enables a user to interact with a device in a "natural" manner, free from artificial constraints imposed by input devices such as mice, keyboards, remote controls, and the like.

Examples of NUI methods include those relying on speech recognition, touch and stylus recognition, gesture recognition both on screen and adjacent to the screen, air gestures, head and eye tracking, voice and speech, vision, touch, gestures, and machine intelligence, and may include the use of touch sensitive displays, voice and speech recognition, intention and goal understanding, motion gesture detection using depth cameras (such as stereoscopic camera systems, infrared camera systems, and other camera systems and combinations of these), motion gesture detection using accelerometers or gyroscopes, facial recognition, three dimensional displays, head, eye, and gaze tracking, immersive augmented reality and virtual reality systems, all of which provide a more natural interface, as well as technologies for sensing brain activity using electric field sensing electrodes (EEG and related methods).

The various computer storage devices 408 and 410, communication connections 412, output devices 416 and input devices 414 can be integrated within a housing with the rest of the computer, or can be connected through various input/output interface devices on the computer in which case the reference numbers 408, 410, 412, 414 and 416 can indicate either the interface for connection to a device or the device itself.

A computer generally includes an operating system, which is a computer program that, when executed, manages access, by other applications running on the computer, to the various resources of the computer. There may be multiple applications. The various resources include the processing devices, coprocessing units, memory, storage, input devices and output devices, such as display devices and input devices as shown in FIG. 4. To manage access to data stored in nonvolatile computer storage devices, the computer also generally includes a file system which maintains files of data. A file is a named logical construct which is defined and implemented by the file system to map a name and a sequence of logical records of data to the addressable physical locations on the computer storage device. A file system generally provides operations such as creating a file, opening a file, writing a file or its attributes, reading a file or its attributes, and closing a file.

The various modules, tools, or applications, and data structures and flowcharts, and graphical user interfaces, described in connection with FIGS. 1-3, as well as any operating system, file system and applications on a computer in FIG. 4, can be implemented using one or more processing devices of one or more computers with one or more computer programs processed by the one or more processing devices.

A computer program includes computer-executable instructions and/or computer-interpreted instructions, such as program modules, which instructions are processed by one or more processing devices or co-processing units in the computer. Generally, such instructions define routines, programs, objects, components, data structures, and so on, that, when processed by a processing device, instruct or configure the computer to perform operations on data, or configure the computer to implement various components, modules or data structures.

Alternatively, or in addition, the functionality of one or more of the various components described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Accordingly, in one aspect, a computer includes a converter application for converting image data from a high dynamic range image to a lower dynamic range for display. The converter application comprises computer program instructions executing on the computer and configures the computer to perform a process. The process includes receiving image data to be displayed from a high dynamic range image; computing metadata for the image data to be displayed, the metadata describing a luminance range of the image data; computing tone mapping parameters for the image data based on at least the computed metadata and characteristics of a display having a lower dynamic range than the high dynamic range image; tone mapping the received image data using the tone mapping parameters to generate output lower dynamic range image data; and presenting the lower dynamic range image data on the display.

In another aspect, a computer-implemented process, for converting image data from a high dynamic range image to a lower dynamic range for display, includes receiving image data to be displayed from a high dynamic range image; computing metadata for the image data to be displayed, the metadata describing a luminance range of the image data; computing tone mapping parameters for the image data based on at least the computed metadata and characteristics of a display having a lower dynamic range than the high dynamic range image; tone mapping the received image data using the tone mapping parameters to generate output lower dynamic range image data; and presenting the lower dynamic range image data on the display.

In another aspect, an article of manufacture comprises a computer storage medium with computer program instructions stored on the computer storage medium which, when processed by a processing device, instruct the processing device to perform a process comprising: receiving image data to be displayed from a high dynamic range image; computing metadata for the image data to be displayed, the metadata describing a luminance range of the image data; computing tone mapping parameters for the image data based on at least the computed metadata and characteristics of a display having a lower dynamic range than the high dynamic range image; tone mapping the received image data using the tone mapping parameters to generate output lower dynamic range image data; and presenting the lower dynamic range image data on the display.

In any of the foregoing aspects, computing the metadata can include generating a luminance histogram based on the image data to be displayed, and can further include determining reference luminance levels describing the luminance range based on the histogram.

In any of the foregoing aspects, the high dynamic range image can be high dynamic range video including a plurality of frames. With video, the process of converting the image data can be performed in real time.

In any of the foregoing aspects, the image data to be displayed is a spatial subset of the high dynamic range image. The image data may have been further subjected to image processing operations.

With video, the computed tone mapping parameters for a current frame can be compared to previously computed tone mapping parameters based on metadata for a plurality of immediately previous sequential frames. In response to the computed tone mapping parameters being within a range of the previously computed tone mapping parameters, the computed tone mapping parameters for the current frame can be used as the tone mapping parameters for the image data to be displayed from the current frame.

With video, the computed tone mapping parameters can be based on averaging a history of previously computed metadata for a plurality of immediately previous sequential frames and the current frame; and computing the tone mapping parameters for the current frame based on the averaged history.

With video, the plurality of immediately previous sequential frames comprises between eight and one hundred twenty frames.

With video, the image data to be displayed can be a temporal subset and/or a spatial subset of high dynamic range video. The image data may have been further subjected to image processing operations.

The computed metadata can include luminance levels in addition to luminance levels specified in standards to allow for more control points for specifying tone mapping.

In another aspect, an article of manufacture includes at least one computer storage medium, and computer program instructions stored on the at least one computer storage medium. The computer program instructions, when processed by a processing system of a computer, the processing system comprising one or more processing units and storage, configures the computer as set forth in any of the foregoing aspects and/or performs a process as set forth in any of the foregoing aspects.

Any of the foregoing aspects may be embodied as a computer system, as any individual component of such a computer system, as a process performed by such a computer system or any individual component of such a computer system, or as an article of manufacture including computer storage in which computer program instructions are stored and which, when processed by one or more computers, configure the one or more computers to provide such a computer system or any individual component of such a computer system.

The subject matter defined in the appended claims is not necessarily limited to the specific implementations described above. The specific implementations described above are disclosed as examples only.

What is claimed is:

1. A computer comprising:
   a converter application for converting image data from a high dynamic range image to a lower dynamic range for display, the converter application comprising computer program instructions executing on the computer and configuring the computer to perform a process, comprising:
   receiving image data to be displayed from a high dynamic range image;
   computing metadata for the image data to be displayed, the metadata describing a luminance range of the image data;
   computing tone mapping parameters for the image data based on at least the computed metadata and characteristics of a display having a lower dynamic range than the high dynamic range image, wherein the high dynamic range image comprises high dynamic range video including a plurality of frames, and computing tone mapping parameters for the image data comprises:
      computing tone mapping parameters based on the computed metadata for the image data to be displayed, the image data to be displayed originating from a current frame of the high dynamic range video;
      comparing the computed tone mapping parameters to previously computed tone mapping parameters based on metadata for a plurality of previous frames; and
      in response to the computed tone mapping parameters being within a range of the previously computed tone mapping parameters, using the computed tone mapping parameters for the current frame as the tone mapping parameters for the image data to be displayed from the current frame;
   tone mapping the received image data using the tone mapping parameters to generate output lower dynamic range image data; and
   presenting the lower dynamic range image data on the display.

2. The computer of claim 1, wherein computing the metadata comprises generating a luminance histogram based on the image data to be displayed.

3. The computer of claim 2, wherein computing the metadata comprises determining reference luminance levels describing the luminance range based on the histogram.

4. The computer of claim 1, wherein the plurality of previous frames comprises between eight and one hundred twenty frames.

5. A computer-implemented process for converting image data from a high dynamic range image to a lower dynamic range for display, comprising:
   receiving image data to be displayed from a high dynamic range image;
   computing metadata for the image data to be displayed, the metadata describing a luminance range of the image data;
   computing tone mapping parameters for the image data based on at least the computed metadata and characteristics of a display having a lower dynamic range than the high dynamic range image, wherein the high dynamic range image comprises high dynamic range video including a plurality of frames, and computing tone mapping parameters for the image data comprises:
      computing tone mapping parameters based on the computed metadata for the image data to be displayed, the image data to be displayed originating from a current frame of the high dynamic range video;
      comparing the computed tone mapping parameters to previously computed tone mapping parameters based on metadata for a plurality of immediately previous sequential frames; and
      in response to the computed tone mapping parameters being within a range of the previously computed tone mapping parameters, using the computed tone mapping parameters for the current frame as the tone mapping parameters for the image data to be displayed from the current frame;
   tone mapping the received image data using the tone mapping parameters to generate output lower dynamic range image data; and
   presenting the lower dynamic range image data on the display.

6. The computer-implemented process of claim 5, wherein computing the metadata comprises generating a luminance histogram based on the image data to be displayed.

7. The computer-implemented process of claim 6, wherein computing the metadata comprises determining reference luminance levels describing the luminance range based on the histogram.

8. The computer-implemented process of claim 5, wherein the plurality of immediately previous sequential frames comprises between eight and one hundred twenty frames.

9. An article of manufacture comprising:
   a computer storage medium;

computer program instructions stored on the computer storage medium which, when processed by a processing device, instruct the processing device to perform a process comprising:

receiving image data to be displayed from a high dynamic range image;

computing metadata for the image data to be displayed, the metadata describing a luminance range of the image data;

computing tone mapping parameters for the image data based on at least the computed metadata and characteristics of a display having a lower dynamic range than the high dynamic range image, wherein the high dynamic range image comprises high dynamic range video including a plurality of frames, and computing tone mapping parameters for the image data comprises:

computing tone mapping parameters based on the computed metadata for the image data to be displayed, the image data to be displayed originating from a current frame of the high dynamic range video;

comparing the computed tone mapping parameters to previously computed tone mapping parameters based on metadata for a plurality of immediately previous sequential frames; and in response to the computed tone mapping parameters being within a range of the previously computed tone mapping parameters, using the computed tone mapping parameters for the current frame as the tone mapping parameters for the image data to be displayed from the current frame;

tone mapping the received image data using the tone mapping parameters to generate output lower dynamic range image data; and presenting the lower dynamic range image data on the display.

10. The article of manufacture of claim 9, wherein computing the metadata comprises generating a luminance histogram based on the image data to be displayed.

11. The article of manufacture of claim 10, wherein computing the metadata comprises determining reference luminance levels describing the luminance range based on the histogram.

12. The article of manufacture of claim 9, wherein the plurality of immediately previous sequential frames comprises between eight and one hundred twenty frames.

* * * * *